United States Patent [19]

Fossan et al.

[11] 3,904,452

[45] Sept. 9, 1975

[54] METHOD FOR THE STABILIZATION OF AQUEOUS SOLUTIONS OF NITROFORM AND STABILIZED SUCH SOLUTIONS

[75] Inventors: Kare Ragnvald Fossan; Gustav Allan Wetterholm, both of Nora, Sweden

[73] Assignee: Nitro Nobel AB, Gyttorp, Sweden

[22] Filed: Aug. 24, 1973

[21] Appl. No.: 391,412

Related U.S. Application Data

[63] Continuation-in-part of Ser. No. 276,277, July 28, 1972.

[30] Foreign Application Priority Data

June 29, 1972 Sweden .............................. 8591/72

[52] U.S. Cl. ..................... 149/74; 149/88; 149/89; 149/91; 260/644
[51] Int. Cl.² ......................................... C06B 47/04
[58] Field of Search ........... 149/88, 89, 91; 260/644

[56] References Cited

UNITED STATES PATENTS

| 2,542,193 | 2/1951 | Hannum | 149/90 |
| 2,692,194 | 10/1954 | Hannum | 149/89 |
| 2,967,099 | 1/1961 | Pool | 149/89 |
| 2,992,910 | 9/1961 | Wetterholm | 149/88 X |
| 3,035,950 | 5/1962 | Long | 149/89 X |
| 3,067,261 | 12/1962 | Clark et al. | 149/89 X |
| 3,125,606 | 3/1964 | Glover et al. | 149/88 X |
| 3,212,254 | 10/1965 | Fox | 149/89 X |
| 3,546,034 | 12/1970 | Francis | 149/89 X |

*Primary Examiner*—Leland A. Sebastian
*Attorney, Agent, or Firm*—Fred Philpitt

[57] ABSTRACT

A method for the stabilization of aqueous solutions of nitroform, which process comprises adding a stabilizing amount of urea or a water-soluble carbamic acid alkyl ester, or a mixture thereof to an aqueous solution of nitroform so as to form the respective reaction product thereof with nitroform. The invention also encompasses stabilized such solutions.

12 Claims, No Drawings

METHOD FOR THE STABILIZATION OF AQUEOUS SOLUTIONS OF NITROFORM AND STABILIZED SUCH SOLUTIONS

RELATED APPLICATION

This application is a continuation-in-part of Application Ser. No. 276,277 filed On July 28, 1972 and since the present application was filed during the pendency of Ser. No. 276,277 the benefits afforded by 35 USC 120 are claimed with respect to it.

The present invention relates to a method for the stabilization of aqueous solutions of nitroform and to stabilized such solutions.

Nitroform is the common designation for trinitromethane. In its pure state nitroform is an explosive and therefore subjected to restrictions as to storage and transportation. The substance may, however, be transported and stored in the form of an aqueous solution because of its solubility in water up to about 45 %. Usually the content of nitroform will be 25 to 45 % by weight. Such solutions do not possess any explosive properties.

Nitroform is suitably prepared by reacting acetylene with concentrated nitric acid. After distilling off remaining concentrated acid an aqueous solution of nitroform is directly obtained by azeotropic distillation after addition of water. Depending on how the distillation is carried out this solution will contain greater or less amounts, usually between 0.5 and 3 a 4 %, of nitric acid. While a very pure solution of nitroform is comparatively stable in aqueous solution technical solutions of nitroform will have a limited durability due to hydrolysis. The durability decreases the higher is the content of nitric acid in the aqueous solution. The nitroform is decomposed under the formation of nitrogen oxides and nitric acid, carbonic acid or carbon monoxide. The formed nitrogen oxides as well as the nitric acid will exert an autocatalytic effect on the decomposition. Thus, when the decomposition reaction has started it will proceed rather rapidly under evolution of heat and gases. For the storing and transportation of nitroform a satisfactory method for the stabilization of the solution of nitroform is thus a necessity.

It is thus an object of the present invention to provide a stable aqueous solution of nitroform.

The remaining hydrogen atom of the nitroform is very active and the compound is hence a strong acid which even with weak bases forms compounds of addition. According to the present invention the object of preparing a stable aqueous solution of nitroform is attained by the addition of urea or watersoluble carbamic acid alkyl esters. In the same way as urea nitrate is formed on the addition of urea to a solution of nitric acid there will be formed urea nitroformate or nitroform derivatives of the carbamic acid esters by the addition of urea respectively of carbamic acid esters to an aqueous solution of nitroform.

In order to obtain stabilization it will usually be necessary to add the urea or the carbamic acid alkyl ester in an amount of at least 0.1 % by weight of the aqueous solution. The required amount of added ingredient will, of course, depend upon the conditions in the storing and possible transport. If the solution is intended to be stored at a comparatively high temperature or to resist lengthy transports a greater amount of the added ingredient will, of course, be required than in the case of storing at lower temperatures. The effect of the stabilizing agent subsists even in the presence of from technical point of view high contents of nitric acid. Suitably, however, the content of nitric acid should amount to at most 6 %, preferably at most 3 % by weight of the solution.

The action of the added ingredient in the aqueous solution of nitroform containing higher or smaller amounts of nitric acid is not fully elucidated. However, there are some reasons to expect that the hydrolysis stabilizing agent, i.e. the reaction product of the added ingredient with nitroform, reacts with nitrogen oxides resp. nitrous acid liberated during the storing under formation of elementary nitrogen. It is possible by means of the surprisingly simple method of the present invention to reduce the decomposition of nitroform to a minimum and to keep the solutions stable for very long periods of time even at elevated temperatures.

The stabilizing agent is slowly consumed. The decomposition may be watched by analysing the nitroform content of the solution. It is also possible to estimate how much "remaining stability" there is still present by determining the remaining amount of the added ingredient. By a fresh addition of ingredient (urea or carbamic acid ester) the content may continuously be held above a fixed lowest level. Although it is fully conceivable to use contents exceeding 1 % by weights contents lower than that mentioned appear to be quite satisfactory for any practical need. Preferably the content of the added ingredient is 0.25 to 0.5 % by weight of the solution.

The invention will be further illustrated in the following by some specific Examples.

EXAMPLE 1

The added ingredient in these cases was urea and the temperature of storing +35°C for 7 days. Analysis for nitroform and nitric acid was carried out after 0 and 7 days.

| Time of storing, days designation | 0 % nitroform | % $HNO_3$ | 7 % nitroform | % $HNO_3$ |
|---|---|---|---|---|
| solution 1 | 42.9 | 1.53 | 30.0 | 9.5 |
| solution 1 + 0.5% urea | 42.7 | 1.52 | 43.1 | 1.3 |
| solution 2 | 43.7 | 1.16 | 36.6 | 4.8 |
| solution 2 + 0.5 % urea | 43.5 | 1.17 | 43.5 | 1.3 |
| solution 3 | 42.8 | 1.70 | 36.4 | 4.8 |
| solution 3 + 0.5 % urea | 42.6 | 1.69 | 43.0 | 1.2 |
| solution 4 | 43.8 | 1.33 | 27.9 | 12.1 |
| solution 4 + 0.5 % urea | 43.6 | 1.32 | 43.5 | 0.90 |

Among the examined solutions all those having an addition of 0.5 % by weight of urea were completely stable for 7 days at +35°C, whereas the solutions without any addition of urea were decomposed up to about 40 % of the original content of nitroform.

EXAMPLE 2

An aqueous solution of nitroform was added with respectively 0.1 and 0.5 % of ethyl carbamic acid ester and stored at 20°C for 37 days. The solution was analysed for nitroform and nitric acid after 0, 7, 14 and 37 days.

| Added ingredient | | days | | | |
|---|---|---|---|---|---|
| | | 0 | 7 | 14 | 37 |
| 0.1% carbamic acid ethyl ester | % nitroform | 38.2 | 38.4 | 38.7 | 38.1 |
| | % HNO₃ | 3.2 | 3.5 | 3.3 | 4.2 |
| 0.5% carbamic acid ethyl ester | % nitroform | 38.0 | 37.8 | 37.3 | 37.0 |
| | % HNO₃ | 3.2 | 2.8 | 3.3 | 3.0 |

The solutions were completely stable.

EXAMPLE 3

An aqueous solution of nitroform was added with 0.1 % of urea resp. 0.1 % of urea and 0.1 % of carbamic acid ethyl ester and stored for 0 – 37 days at 20°C. The solutions were analysed as in Example 1. The content of nitric acid was 3 – 3.5 %. The results may be seen from the following table.

| Added ingredient | | days | | | |
|---|---|---|---|---|---|
| | | 0 | 7 | 14 | 37 |
| 0.1% carbamide | % nitroform | 38.2 | 39.0 | 38.6 | 39.1 |
| | % HNO₃ | 3.2 | 3.2 | 3.5 | 3.6 |
| 0.1% carbamide +0.1% carbamic acid ethyl ester | % nitroform | 38.1 | 39.3 | 39.1 | 38.9 |
| | % HNO₃ | 3.2 | 3.0 | 2.8 | 3.4 |

Thus, the solutions were satisfactorily stabilized also in this case.

EXAMPLE 4

An increased amount of nitric acid in the aqueous nitroform solution increases the rate of decomposition but the method of stabilization according to the invention is quite effective also in this case (Nif = nitroform)

| Designation starting solution | Temp. °C | % at storing for, days | | | | | |
|---|---|---|---|---|---|---|---|
| | | 0 | | 14 | | 37 | |
| | | Nif | HNO₃ | Nif | HNO₃ | Nif | HNO₃ |
| Nif dissolved in water with about 1.5% HNO₃ | 20 | 41.9 | 1.6 | 33.6 | 6.4 | 29.2 | 9.2 |
| Nif dissolved in water with about 3.7% HNO₃ | 20 | 38.3 | 3.7 | 11.8 | 19.7 | 5.4 | 24.5 |
| Nif dissolved in water with about 6.5% HNO₃ | 20 | 33.4 | 6.5 | 32.7 | 6.8 | 4.9 | 24.1 |
| Nif dissolved in water with about 3.5% HNO₃ and 0.5% carbamide | 20 | 38.0 | 3.5 | 38.3 | 3.1 | 38.9 | 3.4 |
| Nif dissolved in water with about 3.5% HNO₃ and 0.1% ethyl carbamate | 20 | 38.5 | 3.5 | 38.7 | 3.3 | 38.1 | 4.2 |

From the results it may be seen that the decomposition of the nitroform is influenced by the nitric acid concentration of the solutions as well as by the temperature. At the temperature stated above, the examined solutions were not stable for 14 days. After the addition of 0.5 % of carbamide respectively 0.1 % of carbamic acid ethyl ester the corresponding nitroform solutions were stable even after storing for 37 days.

EXAMPLE 5

The stability of aqueous solutions of nitroform containing 36.6 % by weight of nitroform and 1.08 % by weight of nitric acid was examined after the addition of respectively 0.5 and 1.4 % by weight of acetamide, 0.5 and 0.8 % by weight of ammonium fluoride and 0.5 % by weight of urea. The stability of a corresponding solution to which no addition was made was also examined. (Acetamide and ammonium fluoride are known from U.S. Pat. No. 3,212,254 to be stabilizers for mixtures of amine nitrates and anhydrous nitric acid.)

The samples were heated in small glass bottles fitted with capillary tubes in ground joints in an oven to 80°C for 4.5 hours, the weight of the samples being registered before and after the heating and the loss in weight of the samples being calculated in % of the weight of the sample before the heating.

The results are summarized in the following table.

TABLE

| Added ingredient | Concentration % by weight | Loss in weight % |
|---|---|---|
| No addition | — | 29.1 |
| Acetamide | 0.50 | 29.5 |
| " | 1.40 | 24.8 |
| Ammonium fluoride | 0.50 | 64.0* |
| " | 0.80 | 29.7 |
| Urea | 0.50 | 0.60 |

*The capillary tube was ejected

From the Table it may be seen that the addition of urea in accordance with the invention leads to an effective stabilization of the nitroform solution against hydrolysis whereas the addition of acetamide or ammonium fluoride does not lead to any appreciable stabilization.

What is claimed is:

1. A stabilized aqueous solution of nitroform that contains (1) at most 6 % by weight of nitric acid and (2) a hydrolysis stabilizing agent, said hydrolysis stabilizing agent consisting essentially of the reaction product of nitroform with 0.1 to 1 % by weight of urea, said % by weight of urea being based upon the weight of the aqueous solution of nitroform.

2. A stabilized aqueous solution of nitroform that contains (1) at most 6 % by weight of nitric acid and (2) a hydrolysis stabilizing agent, said hydrolysis stabilizing agent consisting essentially of the reaction product of nitroform with 0.1 to 1 % by weight of a watersoluble carbamic acid ethyl ester, said % by weight of the water-soluble carbamic acid ethyl ester being based upon the weight of the aqueous solution of nitroform.

3. A stabilized aqueous solution of nitroform which solution contains as the stabilizing agent a stabilizing amount of the reaction product of (a) nitroform and (b) a material selected from the group consisting of (1) urea, (2) a water-soluble carbamic acid alkyl ester and (3) mixtures of urea and a water-soluble carbamic acid alkyl ester.

4. A stabilized aqueous solution according to claim 3, wherein the content of the urea or of the water-soluble carbamic acid ester is 0.1 to 1 % by weight of the aqueous solution.

5. A stabilized solution according to claim 3, wherein the content of the urea or of the water-soluble carbamic acid ester is 0.25 to 0.5 % by weight of the aqueous solution.

6. A stabilized solution according to claim 3, wherein the content of nitroform is 25 to 45 % by weight of the aqueous solution.

7. A stabilized solution according to claim 3, which solution also contains nitric acid.

8. A stabilized solution according to claim 7, wherein the content of nitric acid amounts to at most about 6 % by weight of the solution.

9. A stabilized solution according to claim 7, wherein the content of nitric acid amounts to at most 3 % by weight of the solution.

10. A method for the stabilization of aqueous solutions of nitroform which process comprises adding a stabilizing amount of a material selected from the group consisting of (1) urea or (2) a water-soluble carbamic acid alkyl ester or (3) a mixture of urea and a water-soluble carbamic acid alkyl ester to an aqueous solution of nitroform.

11. A method according to claim 10, wherein the urea, the water-soluble carbamic acid alkyl ester or a mixture thereof is added in an amount of 0.1 to 1 % by weight of the aqueous solution.

12. A method according to claim 10, wherein the urea, the water-soluble carbamic acid alkyl ester or a mixture thereof is added in an amount of 0.25 to 0.5 % by weight of the aqueous solution.

* * * * *